Nov. 29, 1932.　　　L. VON REIS　　　1,889,082
ROLLER CONVEYER FOR GLASS PLATES
Filed May 28, 1928
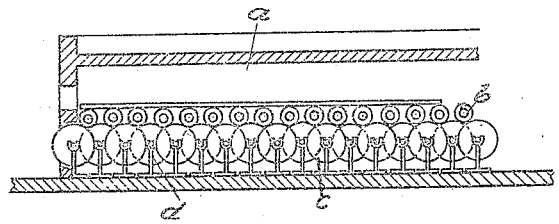
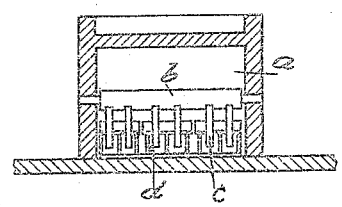

Patented Nov. 29, 1932

1,889,082

UNITED STATES PATENT OFFICE

LAMBERT von REIS, OF HERZOGENRATH, GERMANY, ASSIGNOR, BY MESNE ASSIGNMENTS, TO THE AMERICAN BICHEROUX COMPANY, A CORPORATION OF DELAWARE

ROLLER CONVEYER FOR GLASS PLATES

Application filed May 28, 1928, Serial No. 281,290 and in Germany May 30, 1927.

In the leers for annealing glass plates or glass ribbons there are frequently used roller conveyers for transporting the plates or ribbons through the leer, such conveyers consisting of a continuous series of relatively stationary rollers, of endless roller belts or the like.

In the use of such conveyers the following difficulties are encountered more particularly in the hot part of the leer, especially if the plates are of great width. The distance from the middle of one roller to the middle of the adjacent roller should not exceed a certain amount as otherwise the glass which is still soft is liable to sag between the rollers. It is therefore necessary to make the rollers of a small diameter. Rollers with a small diameter, however, have only a limited strength. Now, rollers required for transporting broad plates have a correspondingly great unsupported length and should therefore be made of a large diameter to increase their strength and prevent undue deflection, this the more because the strength of the roller material is, per se, seriously affected by the high temperature of 600–700° C. in the hot part of the leer. But such rollers with a large diameter have the aforesaid drawback of increasing the distance from the middle of one roller to the middle of the adjacent roller.

The present invention has for its object to overcome the said difficulties and drawbacks and to provide a roller conveyer comprising rollers of small diameter which yet possess the requisite mechanical strength to stand the high temperatures, for instance in the first part of leer, and to resist deflecting forces. This object is attained according to the invention by supporting the conveyer rollers at points intermediate their ends.

Two embodiments of the subject-matter of the invention are illustrated, by way of example, in the accompanying drawing in which:

Fig. 1 is a longitudinal section through a portion of a leer with a continuous series of conveying rollers, Fig. 2 is a transverse section of the leer shown in Fig. 1.

The leer $a$, shown in Figs. 1 and 2, contains a roller conveyer consisting of a continuous series of conveying rollers $b$ which are mounted by their ends in the side walls of the leer. The rollers $b$ are supported at a plurality of points intermediate their ends by rollers $c$ so that the unsupported length of the rollers $b$ is essentially reduced. The rollers $c$ are mounted in standards $d$. There may also be arranged instead of the standards further sets of rollers for supporting the rollers $c$ whereby the friction is reduced to a minimum. With this construction the gearing and the bearings of the conveyer rollers $b$ may be arranged at a very low point so that they will be less affected by the high heat in the leer.

It will be understood that by supporting the rollers of the conveyers intermediate their ends, same may have a comparatively small diameter and yet will not be bent under the weight of the glass plates and the influence of the temperature.

Having thus described my invention, what I claim as new and desire to secure by Letters Patent is:—

1. A roller conveyer for glass plates comprising feed rollers arranged transversely of the direction of feed of the plates and loosely rotatable rollers arranged below and supporting said feed rollers, the last mentioned rollers being disks in staggered relation.

2. In a conveyer, the combination of a series of disks forming a roller support, the disks forming the roller support being in a plurality of groups each having its own axis.

3. In a conveyor, the combination with a series of disks forming a roller support, axes carrying a plurality of said disks, and bearings for said axes between the disks thereon.

In testimony whereof I have signed my name to this specification.

LAMBERT von REIS.